(12) United States Patent
Okumura et al.

(10) Patent No.: US 11,291,945 B2
(45) Date of Patent: Apr. 5, 2022

(54) SELF-HEATING SHEET-LIKE MATERIAL FOR MOISTURE ABSORPTION AND DESORPTION, MOISTURE ABSORPTION AND DESORPTION BODY, AND MOISTURE ABSORPTION AND DESORPTION DEVICE USING THE SAME

(71) Applicant: Tomoegawa Co., Ltd., Tokyo (JP)

(72) Inventors: Katsuya Okumura, Tokyo (JP); Minoru Tsuchida, Shizouka (JP); Daisuke Muramatsu, Shizuoka (JP)

(73) Assignee: Tomoegawa Co., Ltd., Tokyo (JP)

( * ) Notice: Subject to any disclaimer, the term of this patent is extended or adjusted under 35 U.S.C. 154(b) by 380 days.

(21) Appl. No.: 16/465,582

(22) PCT Filed: Jan. 10, 2018

(86) PCT No.: PCT/JP2018/000297
§ 371 (c)(1),
(2) Date: May 31, 2019

(87) PCT Pub. No.: WO2018/131591
PCT Pub. Date: Jul. 19, 2018

(65) Prior Publication Data
US 2019/0308132 A1 Oct. 10, 2019

(30) Foreign Application Priority Data
Jan. 16, 2017 (JP) .............................. JP2017-004961

(51) Int. Cl.
*B01D 53/26* (2006.01)
*B01J 20/16* (2006.01)
(Continued)

(52) U.S. Cl.
CPC ......... *B01D 53/0438* (2013.01); *B01D 53/26* (2013.01); *B01D 53/261* (2013.01);
(Continued)

(58) Field of Classification Search
CPC .... B01D 53/0438; B01D 53/04; B01D 53/26; B01D 53/261; B01D 2253/102;
(Continued)

(56) References Cited

U.S. PATENT DOCUMENTS 2,038,071 A * 4/1936 Wilhelm ............ B01D 46/0038
96/118
3,713,281 A * 1/1973 Asker ....................... B01J 35/04
96/154
(Continued)

FOREIGN PATENT DOCUMENTS

JP H02046682 A 2/1990
JP H05317635 A 12/1993
(Continued)

OTHER PUBLICATIONS

Machine-generated English translation of JP 2009-101275 A, published May 2009.*
(Continued)

*Primary Examiner* — Frank M Lawrence, Jr.
(74) *Attorney, Agent, or Firm* — Wood Herron & Evans LLP

(57) ABSTRACT

The invention of the present application provides a self-heating sheet-like material for moisture absorption and desorption which includes at least a self-heating layer and an adsorption layer in a laminate thereof, in which the self-heating layer and the adsorption layer are connected in a state in which heat conduction is enabled; a moisture absorption and desorption body formed of this material; and a moisture absorption and desorption device.

9 Claims, 4 Drawing Sheets

(51) Int. Cl.
*B01D 53/04* (2006.01)
*B01J 20/02* (2006.01)
*B01J 20/26* (2006.01)
*B01J 20/28* (2006.01)
*H05B 3/20* (2006.01)

(52) U.S. Cl.
CPC .............. *B01J 20/02* (2013.01); *B01J 20/16* (2013.01); *B01J 20/26* (2013.01); *B01J 20/28* (2013.01); *B01J 20/28023* (2013.01); *B01J 20/28035* (2013.01); *H05B 3/20* (2013.01); *B01D 2259/40096* (2013.01)

(58) Field of Classification Search
CPC ........ B01D 2253/104; B01D 2253/106; B01D 2253/108; B01D 2253/11; B01D 2253/1124; B01D 2253/202; B01D 2259/40096; B01D 2259/4508; B01J 20/02; B01J 20/16; B01J 20/26; B01J 20/28; B01J 20/28023; B01J 20/28035; H05B 3/20; H05B 3/26; H05B 2203/034
USPC .......................................... 96/143, 146, 154
See application file for complete search history.

(56) References Cited

U.S. PATENT DOCUMENTS

| | | | | |
|---|---|---|---|---|
| 6,146,451 A * | 11/2000 | Sakata | ............... | B01D 39/2034 96/135 |
| 7,704,305 B2 * | 4/2010 | Nishida | ................. | B01D 53/28 96/154 |
| 8,747,528 B2 * | 6/2014 | Hung | ................ | B01D 53/0438 96/125 |
| 2008/0223841 A1 * | 9/2008 | Lofy | ........................ | H05B 3/20 219/202 |

FOREIGN PATENT DOCUMENTS

| | | |
|---|---|---|
| JP | 06055071 A | 3/1994 |
| JP | 10216458 A | 8/1998 |
| JP | 2004313897 A | 11/2004 |
| JP | 2004333021 A | 11/2004 |
| JP | 2005074359 A | 3/2005 |
| JP | 2006175300 A | 7/2006 |
| JP | 2009101275 A | 5/2009 |
| JP | 2010201307 A | 9/2010 |
| JP | 2010274473 A | 12/2010 |
| JP | 2012148208 A | 8/2012 |
| JP | 2014018722 A | 2/2014 |
| JP | 2014036921 A | 2/2014 |
| JP | 2014118641 A | 6/2014 |
| JP | 2017023995 A | 2/2017 |

OTHER PUBLICATIONS

Machine-generated English translation of JP 2006-175300, published Jul. 2006.*
Japanese Patent Office, Decision of Rejection issued in JP 2018-561380 dated Apr. 6, 2021.
Japanese Patent Office, Office Action issued in JP 2018-561380 dated Nov. 4, 2020.
European Patent Office, Search Report issued in EP 18739372.3 dated Oct. 9, 2020.
PCT Office, International Search Report issued in corresponding PCT/JP2018/000297 filed on Apr. 17, 2018, 4 pages.
Japanese Patent Office, Office Action issued in JP 2020-216900 dated Nov. 2, 2021.

* cited by examiner

SELF-HEATING SHEET-LIKE MATERIAL FOR MOISTURE ABSORPTION AND DESORPTION, MOISTURE ABSORPTION AND DESORPTION BODY, AND MOISTURE ABSORPTION AND DESORPTION DEVICE USING THE SAME

TECHNICAL FIELD

The present invention relates to a self-heating sheet-like material for moisture absorption and desorption which is capable of moisture absorption and moisture desorption, a moisture absorption and desorption body, and a moisture absorption and desorption device using the same.

Priority is claimed on Japanese Patent Application No. 2017-004961, filed Jan. 16, 2017, the content of which is incorporated herein by reference.

BACKGROUND ART

An air-conditioning system of the related art using a refrigerator or cold water adopts a method in which air is supercooled to reduce its humidity and then is reheated, and therefore has disadvantages of unnecessary energy being consumed, and the system being unable to respond flexibly to changes in outside air temperature, humidity, and the like.

Accordingly, a desiccant air-conditioning system has been attracting attention in recent years. A desiccant air-conditioning system is an energy-saving type air-conditioning system in which temperature and humidity are controlled separately. A desiccant air-conditioning system is known to generally exhibit a high level of energy efficiency, because moisture in the air is removed in advance by a sheet-like material for moisture absorption and desorption or a moisture absorption and desorption body such as a dehumidifying rotor, and the dehumidified air thus obtained is cooled. In other words, since the air is dehumidified by moisture therein being removed in advance, thereby stabilizing the humidity of the air to be cooled, the desiccant air-conditioning system can flexibly respond to outside air where it is natural for humidity to increase and decrease and appropriately control indoor air. Therefore, the system is suitable for a space requiring a large amount of outside air to be brought in and a space requiring moisture removal management.

Organic materials represented by polyacrylic acid, or zeolites, silica gel, imogolite, amorphous aluminate, and the like are known as desiccants (hereinafter, also referred to as hygroscopic agents) used in a sheet-like material for moisture absorption and desorption, and a moisture absorption and desorption body such as a dehumidifying rotor, which are used in such an air-conditioning system described above.

As a filter material that uses, regarding these, a desiccant in which there is a large amount of moisture adsorption under all of high-, medium-, and low-humidity environments, and from which low-temperature moisture removal is possible (regeneration), a sheet-like material for dehumidification which includes an amorphous aluminate having specific physical properties and a hygroscopic salt has been proposed (for example, Patent Literature 1).

In addition, as a dehumidifying rotor having a large amount of moisture adsorption and release and a high rate of absorption and release, a dehumidifying rotor including a base material layer having an inorganic hygroscopic agent and an adsorption layer having an organic hygroscopic agent of a specific average fiber diameter has been proposed (for example, Patent Literature 2).

Meanwhile, a material for a dehumidifying rotor in which a non-hygroscopic inorganic filler is contained in a porous sheet having a hygroscopic agent and organic fibers for the purpose of improving workability and the like when honeycomb processing is performed on a sheet-like material for moisture removal (for example, Patent Literature 3), and a dehumidifying filter element which includes two layers including a surface layer in which a planar sheet and a wavy sheet contain at least glass fibers, wood pulp, and binder fibers; and a back surface layer containing wood pulp and binder fibers (for example, Patent Literature 4) have been proposed.

CITATION LIST

Patent Literature

[Patent Literature 1]
 Japanese Unexamined Patent Application, First Publication No. 2010-201307
[Patent Literature 2]
 Japanese Unexamined Patent Application, First Publication No. 2012-148208
[Patent Literature 3]
 Japanese Unexamined Patent Application, First Publication No. 2014-36921
[Patent Literature 4]
 Japanese Unexamined Patent Application, First Publication No. 2014-18722

SUMMARY OF INVENTION

Technical Problem

However, even with the above-described related art, a rate of moisture release is not sufficient, and there is still room for improvement in workability of a sheet-like material for moisture removal.

In the technology of Patent Literature 1, a rate of moisture desorption (%) is shown as an amount of moisture desorption after 2 minutes/an amount of moisture desorption after 5 minutes×100, but this cannot be said to be a sufficient rate of moisture release, and there is still room for improvement from the viewpoint of moisture removal of a high-humidity space, miniaturization of a dehumidifying rotor, and the like.

In the technology of Patent Literature 2, a fibrous organic adsorbent having an average fiber diameter of 50 to 1000 nm is mainly used as a hygroscopic agent. A technical idea thereof is to increase a surface area capable of absorbing and desorbing moisture by increasing a surface area per unit volume, thereby increasing an amount of moisture that can be absorbed and released per unit time. With regard to a rate of moisture release, as in Patent Document 1, there is still room for improvement with regard to the following: although it is possible to release adsorbed moisture and regenerate by ventilation with relatively low-temperature and low-humidity air (about 40 to 80° C. and about 0.1 to 30% RH), a sufficient amount of ventilation for moisture removal is required to be ensured in accordance with an increase in surface area, and the like.

In the technology of Patent Literature 3, the contribution of the materials for a dehumidifying rotor, in which a non-hygroscopic inorganic filler is contained in a porous sheet having a hygroscopic agent and organic fibers, to the rigidity of a honeycomb structure body does not necessarily lead to obtaining sufficient workability.

In the technology of Patent Literature 4, it is difficult to say that improvement in folding ability at the time of honeycomb processing due to an effect of the back surface layer containing wood pulp and binder fibers necessarily leads to obtaining sufficient folding ability at the time of processing.

An object of the present invention is to provide a self-heating sheet-like material for moisture absorption and desorption, in which a rate of adsorbed moisture release is extremely rapid, and workability is excellent even in a case in which processing into a honeycomb structure, a corrugated structure, and the like has been performed; a moisture absorption and desorption body; and a moisture absorption and desorption device using the same.

Solution to Problem

As a result of intensive investigations, the inventors of the present invention have found that it is possible to obtain a self-heating sheet-like material for moisture absorption and desorption, in which a self-heating layer and an adsorption layer are connected in a state in which heat conduction is enabled, thereby making a rate of adsorbed moisture release extremely rapid, and in which workability is excellent even in a case in which processing into a honeycomb structure, a corrugated structure, and the like has been performed; a moisture absorption and desorption body; and a moisture absorption and desorption device using the same. Therefore, the inventors have completed the present invention.

That is, the present invention (1) is a self-heating sheet-like material for moisture absorption and desorption, comprising at least a self-heating layer and an adsorption layer in a laminate thereof, in which the self-heating layer and the adsorption layer are connected in a state in which heat conduction is enabled.

The present invention (2) is the self-heating sheet-like material for moisture absorption and desorption according to the present invention (1), in which the self-heating layer and the adsorption layer are laminated with an adhesion layer therebetween.

The present invention (3) is the self-heating sheet-like material for moisture absorption and desorption according to the present invention (1) or (2), in which the self-heating layer includes an electrode at a free end thereof.

The present invention (4) is the self-heating sheet-like material for moisture absorption and desorption according to the present invention (1), (2), or (3), in which the self-heating layer is made of a metallic fiber sintered body.

The present invention (5) is the self-heating sheet-like material for moisture absorption and desorption according to the present invention (1), (2), (3), or (4), in which fibers constituting the metallic fiber sintered body include at least stainless steel fibers.

The present invention (6) is the self-heating sheet-like material for moisture absorption and desorption according to the present invention (2), (3), (4), or (5), in which the adhesion layer includes at least synthetic fibers.

The present invention (7) is the self-heating sheet-like material for moisture absorption and desorption according to the present invention (1), (2), (3), (4), (5), or (6), in which the adsorption layer includes organic fibers, and at least one or more hygroscopic agents selected from organic hygroscopic agents and inorganic hygroscopic agents.

The present invention (8) is the self-heating sheet-like material for moisture absorption and desorption according to the present invention (1), (2), (3), (4), (5), (6), or (7), in which, regarding a relationship between compressive stress and distortion, the self-heating layer includes a first region exhibiting plastic deformation, and a second region exhibiting elastic deformation which appears in a region where a compressive stress is greater than that of the first region.

The present invention (9) is a moisture absorption and desorption body comprising the self-heating sheet-like material for moisture absorption and desorption according to the present invention (1), (2), (3), (4), (5), (6), (7), or (8).

The present invention (10) is a moisture absorption and desorption device comprising an electrical circuit for supplying current to the electrode; and the self-heating sheet-like material for moisture absorption and desorption or the moisture absorption and desorption body according to the present invention (3), (4), (5), (6), (7), (8), or (9).

Advantageous Effects of Invention

According to the present invention, it is possible to provide a self-heating sheet-like material for moisture absorption and desorption, in which a rate of adsorbed moisture release is extremely rapid, and workability is excellent even in a case in which processing into a honeycomb structure, a corrugated structure, and the like has been performed; a moisture absorption and desorption body; and a moisture absorption and desorption device using the same.

That is, the self-heating sheet-like material for moisture absorption and desorption and moisture absorption and desorption body according to the present invention is able to provide a self-heating sheet-like material for moisture absorption and desorption, in which rising of a temperature of a self-heating layer leads to prompt heating of an adsorption layer connected to the self-heating layer in a state in which heat conduction is enabled, thereby making a rate of moisture release rapid, and in which the self-heating layer functions as an aggregate, thereby making workability excellent even in a case in which processing into a honeycomb structure, a corrugated structure, and the like has been performed; a moisture absorption and desorption body; and a moisture absorption and desorption device using the same.

DESCRIPTION OF EMBODIMENTS

Hereinafter, a self-heating sheet-like material for moisture absorption and desorption, a moisture absorption and desorption body, and a moisture absorption and desorption device using the same of the present invention will be described in detail with reference to drawings. However, embodiments of the self-heating sheet-like material for moisture absorption and desorption, the moisture absorption and desorption body, and the moisture absorption and desorption device using the same of the present invention are not limited thereto.

Figure 1:
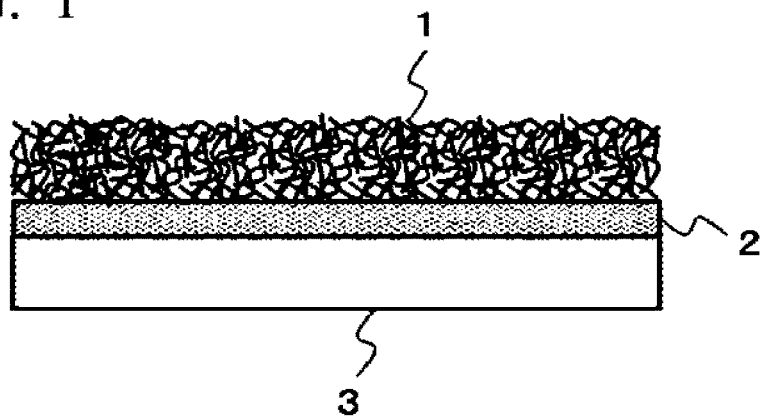
FIG. 1 is a schematic view showing an embodiment of a self-heating sheet-like material for moisture absorption and desorption of the present invention.

A self-heating sheet-like material for moisture absorption and desorption of the present invention shown in FIG. 1 has a structure in which a self-heating layer 1 and an adsorption layer 3 are laminated with an adhesion layer 2 therebetween. Each layer will be described in more detail below. The self-heating layer 1 and the adsorption layer 3 are preferably connected in a state in which heat conduction is enabled, and the adhesion layer 2 is not necessarily required. It is possible to adopt, for example, an aspect in which a material connectable to another layer is disposed on the self-heating layer 1 or the adsorption layer 3, and the self-heating layer 1 and the adsorption layer 3 are directly connected. Examples of materials enabling direct connection include synthetic fibers which exhibit connective strength (adhesive force) due to heat fusion, and the like.

An aspect in which heat conduction is enabled in the present specification refers to an aspect in which the self-heating layer and the adsorption layer are directly connected, or a material with a heat conductivity of 0.03 W/m·K or more is connected to the self-heating layer and the adsorption layer. A value of heat conductivity is based on values in "Chronological Scientific Tables" edited by the National Astronomical Observatory of Japan.

(Self-Heating Layer)

The self-heating layer 1 according to the present invention shown in FIG. 1 exemplifies a sheet made of metallic fibers. The self-heating layer 1 is a layer having a material having self-heating properties. The self-heating properties refer to properties in which a material itself generates heat due to, for example, induction heating or energization, not due to heat conduction from an external heat source. The self-heating layer 1 is not limited to a sheet made of metallic fibers, and may be a layer of metal foil or the like, and may be made of a material other than a metal having the self-heating properties. In addition, the self-heating layer 1 may be composed of a metal having self-heating properties or a material other than a metal. In addition, the self-heating layer 1 may not have a sheet shape. A sheet (hereinafter referred to as a metallic fiber sheet) which is made of metallic fibers in the present specification contains a non-woven fabric of metallic fibers or a woven fabric of metallic fibers.

Examples of metals having self-heating properties are not particularly limited. It is possible to use metals and alloys such as stainless steel, aluminum, brass, copper, iron, platinum, gold, tin, chromium, lead, titanium, nickel, manganin, and nichrome; and a combination of one or two or more kinds selected from these. In addition, a form of a foil shape, a fibrous shape, a particle shape, and the like can be adopted as a form of these metal materials, but there is no particular limitation thereto. As the type of metal material, stainless steel can be suitably used in view of moderate resistance, difficulty of oxidation, processing suitability, and the like.

In a case where the self-heating layer 1 contains metallic fibers, it is preferable to use fibers of stainless steel, aluminum, brass, copper, iron, platinum, gold, tin, chromium, lead, titanium, nickel, manganin, nichrome, and the like from the viewpoints of self-heating properties during energization and processing suitability. It is more preferable that these fibers be a metallic fiber sintered body from the viewpoint that self-heating properties are promptly and easily exhibited. Among these, a stainless steel fiber sintered body is particularly preferable. A sheet resistance of a stainless steel fiber sheet-like sintered body is, for example, about 50 to 300 mΩ/□. In addition, in a case where the self-heating layer 1 is made of a fiber material such as metallic fibers, air permeability can be imparted to the self-heating layer 1. Similarly, in a case where layers other than the self-heating layer of the self-heating sheet-like material for moisture absorption and desorption of the present invention are composed such that they have air permeability, all layers have air permeability. As a result, air and other gases are able to pass through in an aspect in which air and other gases permeate all layers including the self-heating layer 1, and therefore moisture absorption and desorption can be performed. The metallic fiber sintered body in the present specification exhibits a state in which metallic fibers are bonded while maintaining a fiber state before being heated.

An average fiber diameter of the metallic fibers can be set arbitrarily within a range not affecting the formation of a self-heating layer, but is preferably 1 μm to 50 μm. In addition, a cross-sectional shape of a metallic fiber may be any shape such as a circle, an ellipse, a substantially quadrangle, or an irregular shape. An "average fiber diameter of metallic fibers" in the present specification is an average value of area diameters of any number of fibers (for example, an average value of 20 fibers), which is obtained by calculating (by, for example, known software) a cross-sectional area of a metallic fiber based on a vertical cross-section at an arbitrary place in a self-heating layer imaged with a microscope, and calculating a diameter of a circle having the same area as the cross-sectional area.

In addition, it is preferable that metallic fibers have a fiber length of 1 mm or longer. With the presence of fibers of 1 mm or longer, an effect in which interlacing or contact points between metallic fibers can be easily obtained is exhibited even in a case where the self-heating layer according to the present invention is produced by a wet-type sheet-forming method.

(Method for Forming Self-Heating Layer)

For example, in regard to a method for obtaining the self-heating layer 1 mainly composed of metallic fibers, the self-heating layer 1 can be obtained by a dry method for compression molding a web mainly composed of metallic fibers having self-heating properties, a method for performing paper-making with metallic fibers or a raw material mainly composed of metallic fibers by a wet-type sheet-forming method, a method for weaving metallic fibers or the like, and the like.

In a case of obtaining the self-heating layer 1 according to the present invention by a dry method, a sheet can be formed by compressing a metallic fiber body having self-heating properties obtained by a card method, air laid method, or the like. At this time, a binder may be impregnated between fibers to impart bonding between the fibers. Such a binder is not particularly limited, but it is possible to use, for example, organic binders such as acrylic adhesives, epoxy adhesives, and urethane adhesives; and inorganic adhesives such as colloidal silica, water glass, and sodium silicate. Instead of impregnating with the binder, a surface of a fiber may be coated with a heat-meltable resin in advance, an assembly of metallic fibers may be laminated thereon, and then pressurization and heat compression may be performed.

In addition, the self-heating layer 1 can be produced by a wet-type sheet-forming method in which metallic fibers and the like are dispersed in moisture to form a sheet. Specifically, a slurry mainly composed of metallic fibers can be prepared; to this slurry, a filler, a dispersant, a thickener, an antifoaming agent, a paper-strength enhancing agent, a sizing agent, an aggregating agent, a colorant, a fixing agent, or the like can be appropriately added; and wet-type sheet-forming can be performed by a paper-making machine. In addition, it is possible to add, to the slurry, polyethylene terephthalate (PET) resin; polyvinyl alcohol (PVA); polyolefins such as polyethylene and polypropylene; organic fibers exhibiting connectivity by heat melting, such as polyvinyl chloride resin, aramid resin, nylon, and acrylic resin; or the like as a fibrous material other than metallic fibers.

Next, using the above-mentioned slurry, wet-type sheet-forming is carried out by a paper-making machine. As the paper-making machine, it is possible to use a cylinder paper-making machine, a Fourdrinier paper-making machine, a short-Fourdrinier paper-making machine, an inclined-type paper-making machine, a combination paper-making machine obtained by combining paper-making machines of the same or different types, and the like. In addition, a wet paper after paper making can be dewatered and dried using an air dryer, cylinder dryer, suction drum dryer, infrared dryer, or the like to obtain a sheet.

Furthermore, at the time of dewatering, it is preferable to uniformize a water flow rate (dewatering amount) of dewatering in an in-plane or width direction, and the like of a paper-making net. By making a water flow rate constant, turbulent flow and the like at the time of dewatering can be curbed, and a speed of a metallic fiber settling to a paper-making net is uniformized. Therefore, a self-heating layer with high homogeneity and excellent workability can be easily obtained. In order to make a water flow rate at the time of dewatering constant, it is possible to perform measures such as removal of structural objects that may be an obstacle to water flow under a paper-making net. Accordingly, a self-heating layer which has little in-plane variation, is denser, and has excellent workability is easily obtained.

In a case of using a wet-type sheet-forming method, it is preferable to manufacture a self-heating layer through a fiber interlacing treatment step in which components composed mainly of metallic fibers forming a sheet containing moisture on a net are interlaced with each other. As the fiber interlacing treatment step, for example, it is preferable to adopt a fiber interlacing treatment step in which a high-pressure jet water stream is jetted to a surface of a wet paper metallic fiber sheet. Specifically, a plurality of nozzles are disposed in a direction orthogonal to a flow direction of a sheet, a high-pressure jet water stream is jetted at the same time from these plurality of nozzles, and therefore it is possible to interlace fibers composed mainly of metallic fibers over the entire sheet.

In the self-heating layer 1 according to the present invention produced in the above-mentioned operations, for example, it is preferable that metallic fibers be bonded to each other, and a pressing (pressurizing) step be carried out before the binding. Performing the pressing step before binding is preferable from the viewpoint of easily imparting excellent workability to the self-heating layer 1 according to the present invention, because it is easy to reliably provide a binding portion between metallic fibers in the subsequent binding process (easy to increase the number of binding points), and therefore it becomes easier to obtain a first region exhibiting plastic deformation, and a second region exhibiting elastic deformation which appears in a region where a compressive stress is greater than that of the first region. In addition, pressing may be carried out with heating or non-heating. However, in a case where the self-heating layer 1 according to the present invention contains organic fibers or the like that exhibit connectivity due to heating and melting, heating at a temperature above a melting start temperature is effective, and in a case where the self-heating layer 1 is composed of only metallic fibers or is composed of plural kinds of metal components, performing only pressurization is sufficient. Furthermore, a pressure at the time of pressurization may be set appropriately in consideration of a thickness of the self-heating layer 1. For example, in a case of a self-heating layer having a thickness of about 170 performing pressurization at a linear pressure of less than 300 kg/cm, preferably less than 250 kg/cm is preferable, because it becomes easy to impart favorable workability to a self-heating layer according the present invention. Furthermore, a space factor of the self-heating layer can also be adjusted by this pressing step. A space factor in the present specification is a ratio of a portion where fibers exist to a volume of the self-heating layer, and is calculated from a basis weight and a thickness of the self-heating layer, and a true density of metallic fibers by the following equation (in a case where the self-heating layer is composed of only metallic fibers). In a case where the self-heating layer contains a plurality of metallic fibers, fibers other than metallic fibers, and the like, a space factor can be calculated by applying a true density value reflecting a compositional ratio.

Space factor (%)=basis weight of self-heating layer/ (thickness of self-heating layer×true density of metallic fibers)×100

In addition, in regard to the self-heating layer (for example, a non-woven fabric of metallic fibers) obtained by the above-mentioned dry method or wet-type sheet-forming method, these methods preferably include a sintering step of sintering at a temperature below a melting point of metallic fibers in a vacuum or non-oxidizing atmosphere. It is possible to increase a strength of the self-heating layer after sintering by binding at contact points of metallic fibers, and therefore it becomes easy to obtain uniform self-heating properties at the time of energization and easy to improve workability. A basis weight of the self-heating layer produced as above can be arbitrarily adjusted according to a required resistance value and is not limited thereto, but is preferably 100 g/m$^2$ to 200 g/m$^2$ from the viewpoint of processing suitability.

In addition, it is possible to further improve homogeneity of the sintered self-heating layer by performing the pressing (pressurizing) step after sintering. In the self-heating layer in which fibers are randomly interlaced, the fibers are shifted not only in a thickness direction but also in a surface direction by being compressed in the thickness direction. Accordingly, an effect of facilitating the disposition of metallic fibers even in a place which was an air gap at the time of sintering can be expected, and this state is maintained by a plastic deformation characteristic of metallic fibers. Therefore, a self-heating layer which has little in-plane variation, is denser, and has excellent workability is obtained.

In addition, by a method for producing a self-heating layer by weaving metallic fibers and the like, the self-heating layer can be made into a form of plain weave, twill weave, herringbone weave, tatami weave, triple weave, and the like by the same method as weaving.

Regarding a relationship between compressive stress and distortion, the self-heating layer 1 according to the present invention preferably has a first region exhibiting plastic deformation, and a second region exhibiting elastic deformation which appears in a region where a compressive stress is greater than that of the first region. In the present specification, plastic deformation is deformation that occurs prior to elastic deformation with respect to an external force (compression stress), and refers to deformation in which a form of a material which receives an external force does not recover to a state before the external force was applied even after the external force has been removed. Elastic deformation refers to a deformation in which a form of a material which receives an external force recovers to a state before the external force was applied after the external force has been removed.

Plastic deformation and elastic deformation can be checked from a stress-distortion curve by performing a compression test in compression and release cycles. The compression test can be performed using, for example, a tensile/compressive stress measurement tester. First, a 30 mm square test piece is prepared. For example, a thickness of the test piece prepared using a Digimatic indicator ID-C112X manufactured by Mitutoyo Corporation is measured as a thickness before the compression test. This micrometer can raise and lower a measurement probe by air, and a speed thereof can be arbitrarily adjusted. Some test pieces are easily crushed by a slight amount of stress, and therefore when lowering the measurement probe, the measurement probe is lowered as slowly as possible so that only a weight of the probe itself is applied to the test piece. In addition, the probe is only applied once. A thickness measured at this time is used as a "thickness before the test."

Then, the compression test is performed using the test piece. A 1 kN load cell is used. A jig used for the compression test uses a stainless steel compression probe having a diameter of 100 mm. A compression speed is 1 mm/min, and compression and release operations of the test piece are performed three times. Thereby, plastic deformation and elastic deformation of the self-heating layer according to the present invention can be checked.

In addition, from the "stress-distortion curve (chart)" obtained by the test, an actual distortion with respect to stress can be calculated, and an amount of plastic deformation can be calculated according to the following equation.

Amount of plastic deformation=(distortion of rising portion at first time of compression)−(distortion of rising portion at second time of compression)

At this time, a rising portion refers to distortion at 2.5 N compressive stress.

A thickness of the test piece after the test is measured in the same manner as described above, and is used as a "thickness after the test."

In addition, a plastic deformation rate of the self-heating layer according to the present invention is preferably within a desired range. The plastic deformation rate indicates a degree of plastic deformation of the self-heating layer. The plastic deformation rate in the present specification (for example, the plastic deformation rate when a load is gradually increased from 0 MPa to 1 MPa) is defined as follows.

Plastic deformation amount (μm)=$T0-T1$

Plastic deformation rate (%)=$(T0-T1)/T0×100$

T0 shown above is a thickness of the self-heating layer before applying the load.

T1 shown above is a thickness of the self-heating layer after applying the load and then releasing.

In the self-heating layer according to the present invention, plastic deformation preferably occurs in the first region. The plastic deformation rate is preferably 1% to 90%, even more preferably 4% to 75%, particularly preferably 20% to 55%, and most preferably 20% to 40%. For example, in a case where the self-heating sheet-like material for moisture absorption and desorption of the present invention is subjected to a corrugated processing and the like, when the plastic deformation rate is within a range of 1% to 90%, it is easy to impart shape conformability to the sheet-like material having the self-heating layer, and as a result, it can be expected that there will be an effect of improving workability.

Figure 4:
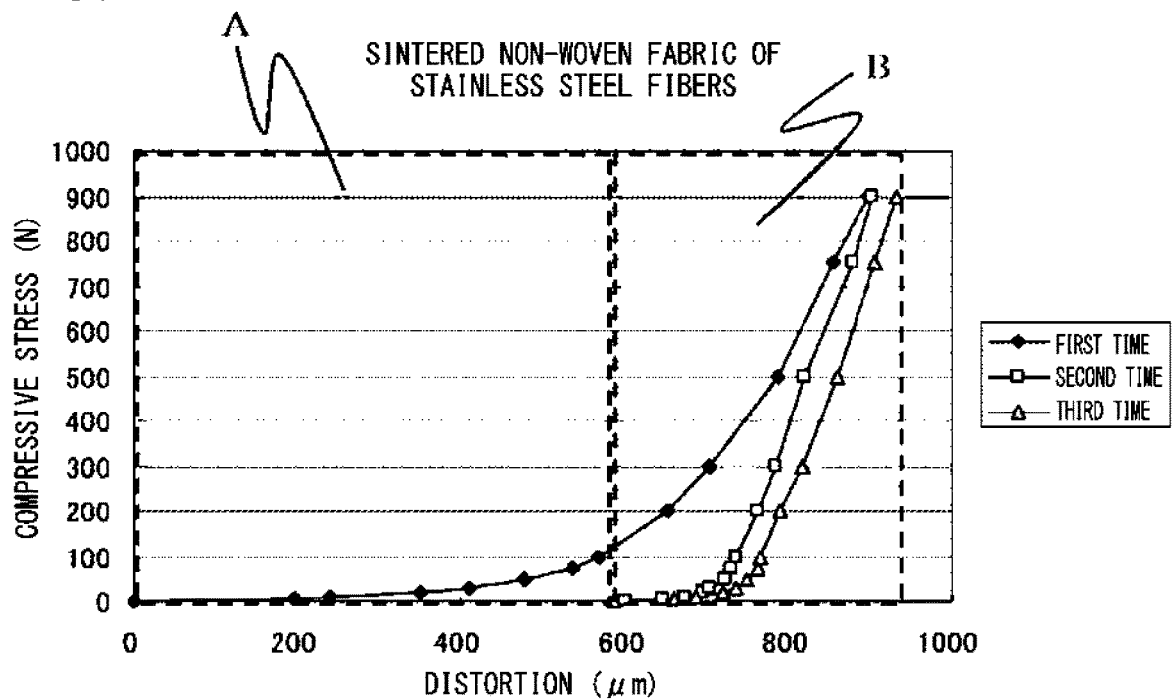
FIG. 4 is a graph when a compression test is performed, in compression and release cycles, on a sintered non-woven fabric of stainless steel fibers which can be used as a self-heating layer according to the present invention.

FIG. 4 is a graph when a compression test is performed, in compression and release cycles, on a sintered non-woven fabric of stainless steel fibers which can be used as a self-heating layer having a thickness of 1020 μm. The sintered non-woven fabric of stainless steel fibers of the present invention is obtained by performing paper-making with stainless steel fibers having a fiber diameter of 8 μm and a fiber length of 3 mm together with organic fibers and sintering the resulting product. A basis weight of the sintered non-woven fabric of stainless steel fibers of the present invention is 200 g/m$^2$. In the graph, first to third indicates the number of times of compression. The first time plots measured values at the first compression, next, the second time plots measured values at the second compression, and furthermore, the third time plots measured values at the third compression. According to the above values, it can be understood that the sintered non-woven fabric of stainless steel fibers which can be used as the self-heating layer according to the present invention has a first region exhibiting plastic deformation A, and a second region exhibiting elastic deformation B. That is, since the self-heating layer according to the present invention (herein, a sintered non-woven fabric of stainless steel fibers) has the first region exhibiting plastic deformation A, an effect of easily improving workability of the sheet-like material due to the plastic deformation characteristic that the self-heating layer has is exhibited even in a case where the self-heating sheet-like material for moisture absorption and desorption is subjected to a processing such as being processed into a honeycomb structure and a corrugated structure.

This change is also produced by compression in the thickness direction of the self-heating layer, and compressive stress is generated inside a bending portion also when the self-heating layer receives a bending stress. For example, in a case where the self-heating sheet-like material for moisture absorption and desorption of the present invention is bent in honeycomb processing and the like, a difference in distance corresponding to a curvature occurs between the inside and the outside of the bending portion of the self-heating layer constituting the structure. For example, in a case where the self-heating layer is composed of metallic fibers, spaces in the layer which fill in differences in distance become smaller. As a result, compressive stress is generated inside the self-heating layer in the bending portion.

Figure 5:
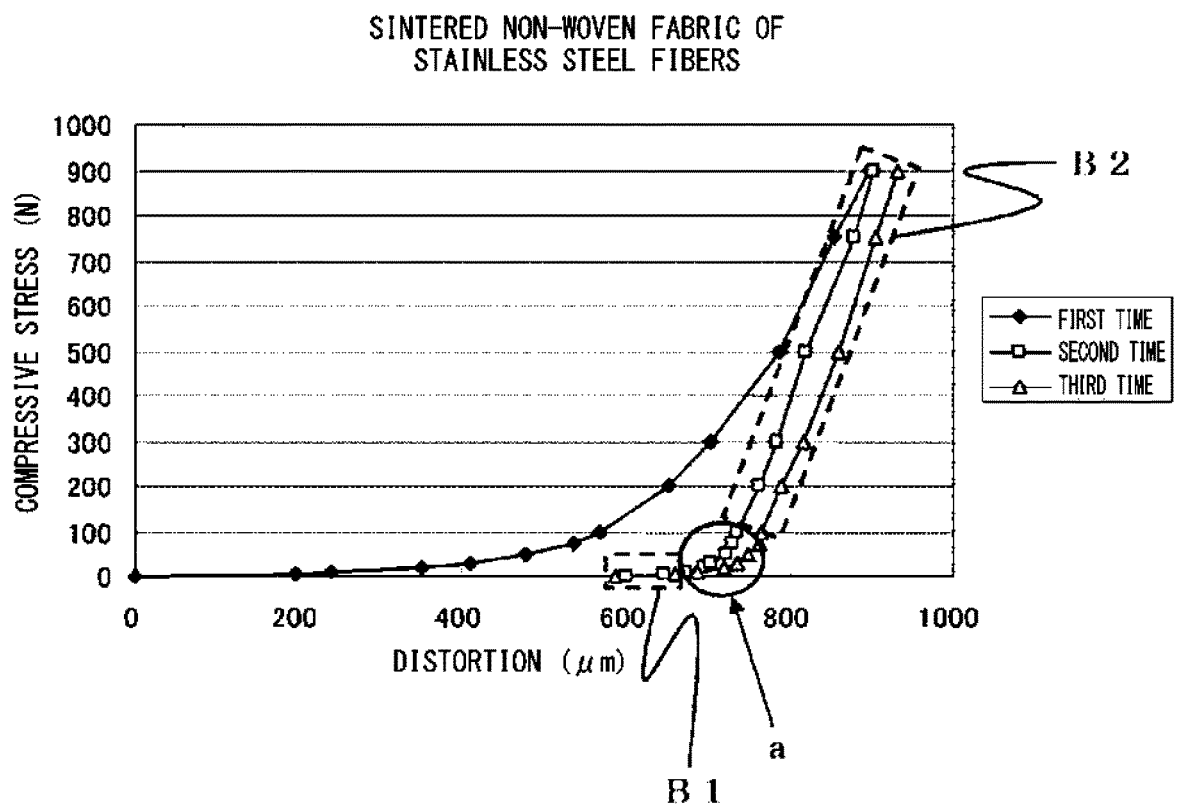
FIG. 5 is a graph illustrating in detail an elastic deformation region of the sintered non-woven fabric of stainless steel fibers which can be used as the self-heating layer according to the present invention.

In addition, it is preferable that the second region exhibiting elastic deformation B have an inflection portion a at distortion with respect to compressive stress. FIG. 5 is a graph illustrating the second region exhibiting elastic deformation B according to the present invention in more detail, and data values thereof are the same as those in FIG. 4. A region B1 showing elastic deformation before the inflection portion a shown in FIG. 5 is considered to be a so-called spring elastic region. A region B2 showing elastic deformation behind the inflection portion a is a so-called distortion elastic region accumulating distortion inside metal. That is, for example, the sintered non-woven fabric of stainless steel fibers, which can be used as the self-heating layer according to the present invention, has the region B1 exhibiting elastic deformation anterior to the inflection portion a, which is region having a flexible elastic deformation characteristic, on the second region exhibiting elastic deformation B; and the region B2 exhibiting elastic deformation posterior to the inflection portion a, which is a region having a relatively rigid elastic deformation characteristic. Therefore, even after the self-heating sheet-like material for moisture absorption and desorption is subjected to a processing such as a honeycomb structure and a corrugated structure, an effect of easily stabilizing a form of the sheet-like material due to a form stabilization effect that the self-heating layer has is easily exhibited.

In addition, an elongation proportion measured according to JIS P8113 of the self-heating layer according to the present invention is preferably 1% to 5%. In a case where the elongation proportion is less than 1%, and, for example, in a case where the self-heating sheet-like material for moisture absorption and desorption of the present invention is subjected to a corrugated processing and the like, the self-heating layer may break. In a case where the elongation proportion exceeds 5%, materials forming the self-heating layer may partially become coarse. The elongation rate of the self-heating layer according to the present invention shown in FIG. 4 is 2.8%.

(Adsorption Layer)

The adsorption layer 3 according to the present invention may have any constitution as long as the layer has a moisture adsorption capacity, but is preferably a layer that has air permeability and is composed of at least one selected from organic fibers, organic hygroscopic agents, and inorganic hygroscopic agents.

As the organic fiber, it is possible to use fibers which are made of thermoplastic synthetic resin such as olefin resin, polyester resin, polyethylene terephthalate resin, polyvinyl acetate resin, ethylene vinyl acetate copolymer resin, polyamide resin, acrylic resin, polyvinyl chloride resin, polyvinylidene chloride resin, polyvinyl ether resin, polyvinyl ketone resin, polyether resin, polyvinyl alcohol resin, diene resin, and polyurethane resin, or thermosetting synthetic resin such as phenolic resin, melamine resin, furan resin, urea resin, aniline resin, unsaturated polyester resin, and alkyd resin; plant fibers such as wood pulp, paper mulberry, paper bush, straw, kenaf, bamboo, linter, bagasse, esparto, and sugar cane; and a product obtained by refining the above-described examples. In addition, it is possible to use rayon fibers, which are regenerated cellulose fibers, semi-synthetic fibers such as acetate, fluorocarbon resin fibers such as polytetrafluoroethylene (PTFE), silicone resin fibers, metallic fibers such as stainless steel or nickel wool, carbon fibers, ceramic fibers, glass fibers, and the like. Among them, wood pulp is preferably contained in view of carrying ability with respect to the hygroscopic agent, post-processing adaptability, and the like. Examples of wood pulp include chemical pulp such as high yield needle unbleached kraft pulp (HNKP; N material), needle bleached kraft pulp (NBKP; N material, NB material), leaf unbleached kraft pulp (LUKP; L material), and leaf bleached kraft pulp (LBKP, L material); mechanical pulp such as groundwood pulp (GP), pressurized groundwood pulp (PGW), and thermomechanical pulp (TMP); waste paper pulp such as deinking pulp (DIP) and waste pulp (WP); semi-chemical pulp (CP); and the like. In addition, a structure of a thermoplastic synthetic resin may be a main fiber having a substantially single composition in a cross section and having no core-sheath structure, or may have a core-sheath structure. When the adsorption layer contains a thermoplastic synthetic resin or a thermosetting synthetic resin, it is easy to greatly improve workability and form stability of the self-heating sheet-like material for moisture absorption and desorption, which is processed through heating and pressing steps.

As the organic hygroscopic agent, an organic hygroscopic agent such as a water-absorbing polymer typified by a polyacrylic acid, and carboxymethyl cellulose can be used.

As the inorganic hygroscopic agent, it is possible to use sepiolite, zeolite, bentonite, attapulgite, diatomaceous earth, diatomite shale, activated carbon, porous silica, aluminum hydroxide, fibrous titanium oxide, allophane, imogolite, amorphous aluminum silicate, aluminum silicate composite composed of low crystalline-layered clay mineral and amorphous aluminum silicate, and the like. Among them, an aluminum silicate composite composed of low crystalline-layered clay mineral and amorphous aluminum silicate can be suitably used because this composite can be dehumidified at a relatively low temperature.

These hygroscopic agents may be used alone or in combination of two or more kinds thereof. In addition, a content of the hygroscopic agent in the adsorption layer is preferably 60% by mass to 90% by mass, more preferably 65 to 85% by mass, and even more preferably 70 to 80% by mass with respect to a total mass of the adsorption layer. When the content is less than 60% by mass, there may be a case in which a target dehumidifying performance is difficult to obtain. When the content exceeds 90% by mass, falling off and the like of the hygroscopic agent are likely to occur due to a decrease in ingredient amount of organic fibers, and therefore workability may deteriorate. The fact that the adsorption layer 3 according to the present invention is laminated to at least the self-heating layer 1 constituting the self-heating sheet-like material for moisture absorption and desorption is advantageous for form stability being easily ensured at the time of processing, whereby a high mass of hygroscopic agent can be added.

The adsorption layer 3 according to the present invention can be manufactured by the following method, and Method (1) is suitable for mass production.

Method (1): A method for obtaining a sheet containing a hygroscopic agent supported on organic fibers by a wet-type sheet-forming method or a dry method.

Method (2): A method for coating a sheet containing organic fibers obtained by a wet-type sheet-forming method or a dry method with a hygroscopic agent.

Method (3): A method for forming a self-heating layer or an adhesion layer by coating the same with a hygroscopic agent and organic fibers.

Method (1)

As the dry method, a card method, an air laid method, and the like can be used. The wet-type sheet-forming method is a method of dispersing organic fibers, a hygroscopic agent, and the like in water at a low concentration to make the same into a paper, and is a method that is inexpensive, highly uniform, and capable of mass production. Specifically, a slurry mainly composed of organic fibers and an hygroscopic agent is prepared; to this slurry, a filler, a dispersant, a thickener, an antifoaming agent, a paper-strength enhancing agent, a sizing agent, an aggregating agent, a colorant, a fixing agent, or the like is appropriately added; and wet-type sheet-forming is performed by a paper-making machine. As the paper-making machine, it is possible to use a cylinder paper-making machine, a Fourdrinier paper-making machine, a short-Fourdrinier paper-making machine, an inclined-type paper-making machine, a combination paper-making machine obtained by combining paper-making machines of the same or different types therefrom, and the like. In addition, a wet paper after paper making can be dried using an air dryer, cylinder dryer, suction drum dryer, infrared dryer, or the like to obtain a sheet. A basis weight of the sheet produced in this manner is an arbitrary value depending on the type, addition amount, and the like of the hygroscopic agent, but there is no particular limitation thereto.

In the wet-type sheet-forming method, an aggregating agent can also be added to stabilize a sheet-forming slurry composed of organic fibers, a hygroscopic agent, and the like. Examples of the aggregating agent include metal hydroxides such as zinc hydroxide, aluminum hydroxide, and magnesium hydroxide; metal oxides or metal silicates such as alumina, silica, aluminum silicate, and magnesium silicate; hydrates of these metal oxides or metal silicates; water-soluble polymers such as aluminum sulfate, polyaluminum chloride, anionically or cationically modified polyacrylamides, similarly polyethylene oxide polymers, and acrylic acid- or methacrylic acid-containing copolymers; alginic acid and polyvinyl phosphonic acid, and alkaline salts thereof; ammonia; alkyl amines such as diethylamine and ethylene diamine; alkanolamines such as ethanolamine; pyridine; morpholine; acryloyl morpholine-containing polymers; and the like. In particular, among aggregating agents of an anionically or cationically modified water-soluble polymer, an amphoteric aggregating agent in which both cationic unit and anionic unit are included in a polymer is preferable because this agent can exhibit an excellent aggregation effect. In addition, sizing agents represented by alkyl ketene dimers and acrylic resins can also be added. Moisture may be added to aid workability when processing the self-heating sheet-like material for moisture absorption and desorption in some cases, but the sizing agent prevents excessive water absorption of added moisture, and therefore an effect by which workability is easily improved is exhibited.

Method (2)

Method (2) is a method for coating a sheet mainly composed of organic fibers produced according to Method (1) with a hygroscopic agent. As a coating medium, water, water and alcohol, a mixed solution with an organic solvent such as ketone, and the like can be suitably used. For the coating, an impregnation or coating apparatus such as a size press, a gate roll coater, an air knife coater, a blade coater, a comma coater, a bar coater, a gravure coater, or a kiss coater can be used.

Method (3)

Method (3) is a method in which a coating solution mainly composed of organic fibers and a hygroscopic agent is prepared, and coating is performed with a self-heating layer or an adhesion layer 2 to be described later, or the like as a substrate according to Method (2).

(Adhesion Layer)

The self-heating layer 1 and the adsorption layer 3 according to the present invention may be laminated with the adhesion layer 2 therebetween. The adhesion layer 2 according to the present invention can adopt any aspect as long as the self-heating layer 1 and the adsorption layer 3 can be connected in a state in which heat conduction is enabled.

In a case where a main purpose is to efficiently transfer heat generated in the self-heating layer 1, the adhesion layer 2 can also be used for conductive adhesive and adherence. In a case where the self-heating layer 1 is composed mainly of a non-woven fabric of metallic fibers, for example, by making the adhesion layer 2 as a synthetic fiber sheet or the like, which is made of synthetic fibers having a form-maintaining property at the time of melting, such as core-sheath fibers, air permeability can be imparted to the self-heating sheet-like material for moisture absorption and desorption of the present invention. In this case, lamination of the self-heating layer 1 and the adsorption layer 3 may be performed by thermal welding or the like of synthetic fibers. By heat-welding with such a synthetic resin, an effect by which workability and form stability of the self-heating sheet-like material for moisture absorption and desorption are easily improved is exhibited. In addition, a synthetic fiber sheet may be a woven or non-woven fabric.

As synthetic fibers used for the synthetic fiber sheet, it is possible to use polyamide fibers, polyester fibers, polyethylene terephthalate fibers (hereinafter, referred to as PET fibers), isophthalic acid-modified polyethylene terephthalate fibers (hereinafter, referred to as modified PET fibers), acrylic fibers, polyolefin fibers, aramid fibers, polyethylene naphthalate fibers, polybutylene terephthalate fibers, polyarylene sulfide resin (for example, polyphenylene sulfide fibers), polyacetal fibers, liquid crystal polymer fibers, polyimide fibers, and the like. However, from the viewpoint of easily maintaining a fiber form at the time of melting (easiness of securing air permeability), it is preferable use PET fibers of core-sheath structure or modified PET fibers.

In a method for forming the adhesion layer 2, in a case where a coating is performed with the self-heating layer 1 or the adsorption layer 3 as a substrate, or when the adhesion layer 2 is mainly composed of fibers, the adhesion layer 2 can be formed by the wet-type sheet-forming method, dry method, or the like.

A method for laminating the self-heating layer and the adsorption layer with the adhesion layer therebetween may be any method as long as the self-heating layer and the adsorption layer are connected in a state in which heat conduction is enabled. A method suitably selected depending on a material constituting the adhesion layer may be used. That is, in a case where the adhesion layer has adhesiveness, tackiness, and the like, lamination may be performed utilizing these adhesiveness and tackiness. For example, lamination may be performed under heating conditions in a case where the adhesion layer has a thermally meltable fibrous material.

Figure 6:
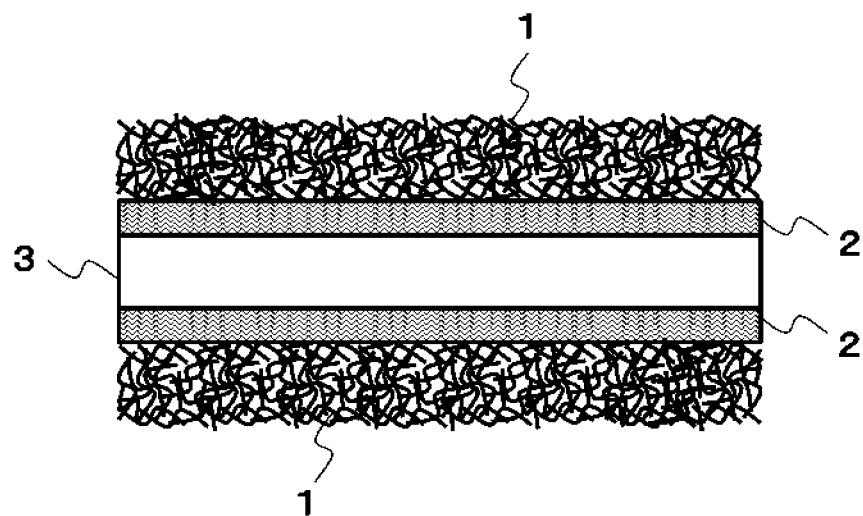
FIG. 6 is a schematic view showing another embodiment of a self-heating sheet-like material for moisture absorption and desorption of the present invention.

In addition, the self-heating sheet-like material for moisture absorption and desorption of the present invention can have a configuration in which an adsorption layer shown in FIG. 6 is sandwiched between self-heating layers. Specifically, this configuration has a laminated structure of a self-heating layer, an adsorption layer, and a self-heating layer, or has a laminated structure of a self-heating layer, an adhesion layer, an adsorption layer, an adhesion layer, and a self-heating layer. With such a structure, a rate of moisture release is extremely fast, and it is easy to obtain a self-heating sheet-like material for moisture absorption and desorption, which has a low risk of falling off of an adsorbent.

(Moisture Absorption and Desorption Body)

Figure 2:
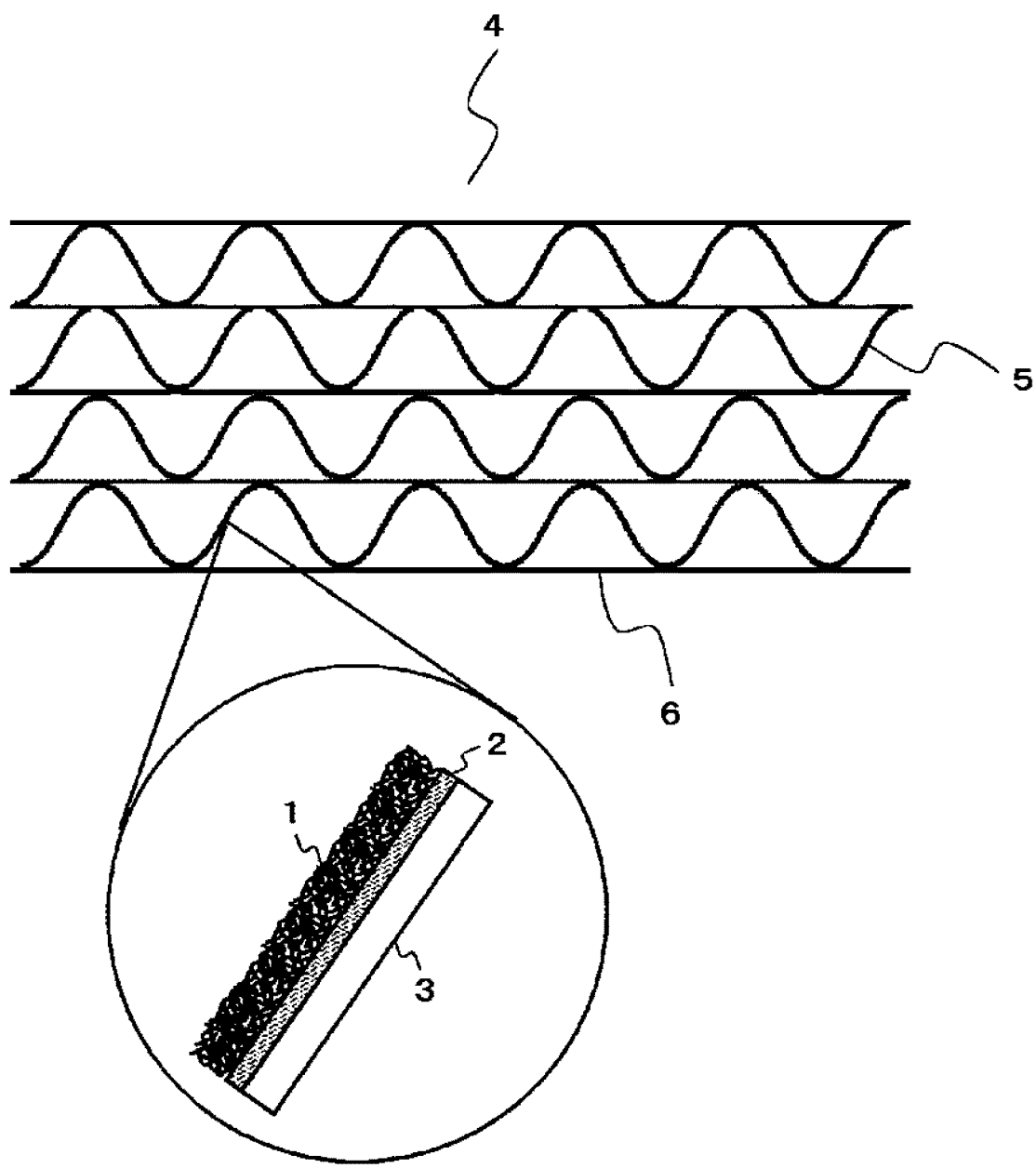
FIG. 2 is a schematic view showing an example of a cross-sectional configuration of a moisture absorption and desorption body of the present invention.

FIG. 2 shows an example of a moisture absorption and desorption body 4 having a form in which the self-heating sheet-like material for moisture absorption and desorption of the present invention is subjected to a corrugated processing so as to make the material as a core 5, the self-heating sheet-like material for moisture absorption and desorption is made as a liner 6, and cardboard-like materials are laminated. The moisture absorption and desorption body 4 is not limited to the above-mentioned example, and can have a honeycomb structure or the like. By performing such a processing, it is possible to subject a surface area to an operation to increase an amount of moisture absorption. In addition, it is possible to improve stiffness of the moisture absorption and desorption body 4 by the structuration. In addition, the self-heating layer 1 constituting the self-heating sheet-like material for moisture absorption and desorption of the present invention is excellent in processing suitability in a case of being subjected to a corrugate processing, honeycomb processing, or the like due to the above-mentioned characteristics, and also has a high level of form stability. Furthermore, in a case where the self-heating layer 1 is a layer mainly composed of metallic fibers, as described above, elongation can also be expected at the time of processing, and in addition, an elastic deformation region (second region exhibiting an elastic deformation region) is left after processing. Therefore, even if an external force is applied to the moisture absorption and desorption body 4, the self-heating layer 1 has a form-restoring force, and has a characteristic of being easy to contribute to form stability of the moisture absorption and desorption body 4.

(Moisture Absorption and Desorption Device)

Figure 3:
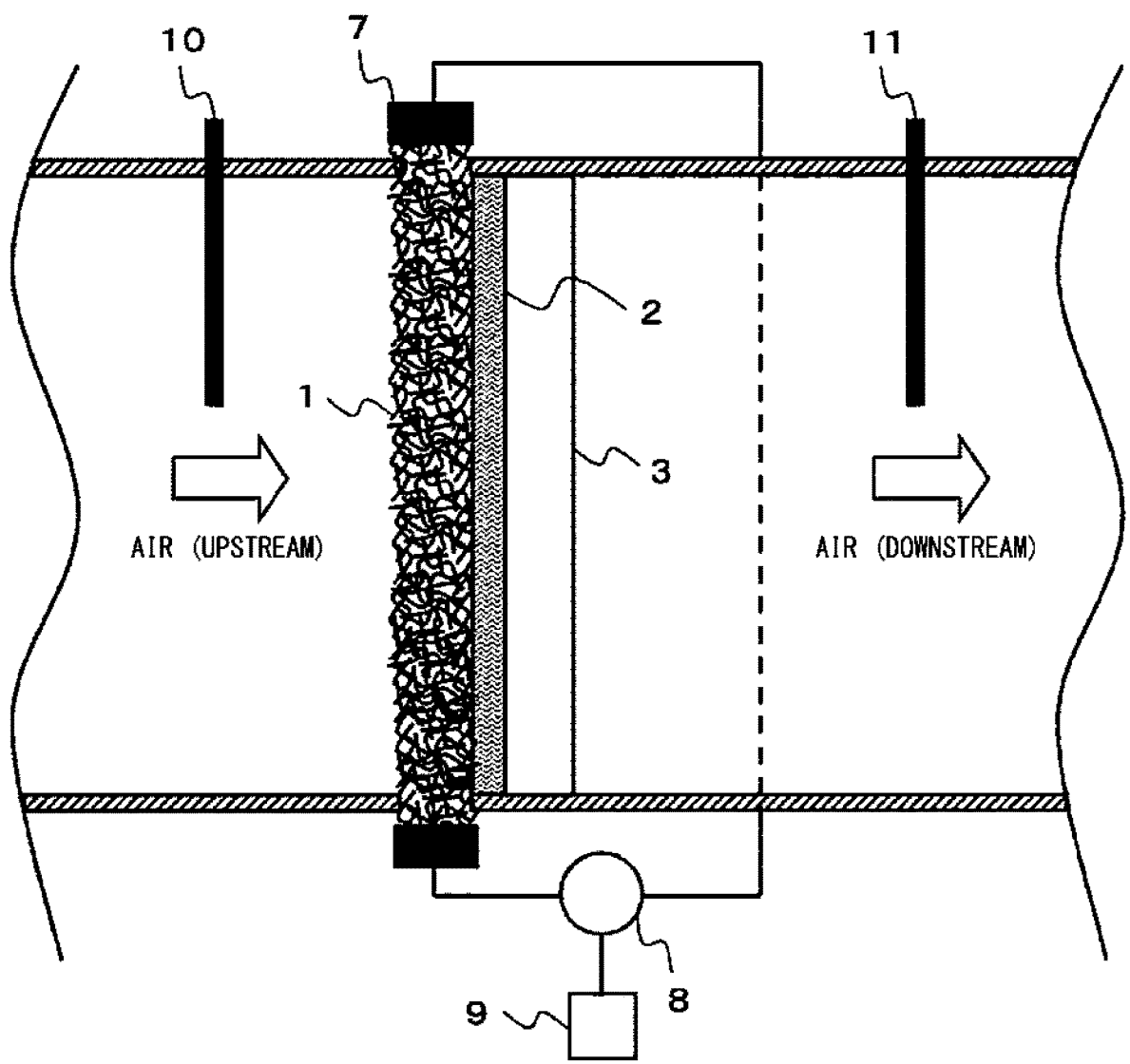
FIG. 3 is a schematic view showing an example of a moisture absorption and desorption device of the present invention.

FIG. 3 is a schematic view showing an example of a moisture absorption and desorption device in which the self-heating sheet-like material for moisture absorption and desorption of the present invention having a layer configuration having air permeability is installed in a ventilation path.

Air containing moisture penetrates the self-heating layer 1 and the adhesion layer 2 from the upstream side to reach the adsorption layer 3, and the adsorption layer 3 adsorbs moisture. At this time, the self-heating layer 1 can play a role not only as a heat source to be described later, but also as a filter for removing dust, and the like, for example. In a case where the adsorption layer 3 reaches a moisture adsorption limit, or in a case where a moisture adsorption performance of the adsorption layer 3 deteriorates, a power supply 8 carries out energization with respect to the electrode 7 via an electrical circuit. Then, the self-heating layer 1 self-generates heat, and this heat rapidly heats the adsorption layer 3 via the adhesion layer 2, and moisture removal from the adsorption layer 3 is rapidly performed. At this time, hot air or the like can be supplied at the same time to further improve a rate of moisture removal. In the self-heating sheet-like material for moisture absorption and desorption of the present invention, the self-heating layer 1 and the adsorption layer 3 are connected in a state in which heat conduction is enabled. Therefore, hygroscopic regeneration tends to be easily and extremely rapidly completed, as compared to a system of the related art, in which only hot air is used for regeneration, such as a desiccant rotor. In addition, the moisture absorption and desorption device of the present invention is not limited to this example. By an aspect in which a plurality of self-heating sheet-like materials for moisture absorption and desorption or moisture absorption and desorption bodies are prepared, or by structuring a moisture absorption and desorption body, a heating region and a non-heating region of the self-heating layer 1 may be formed in one moisture absorption and desorption body. Furthermore, a free end of the self-heating layer does not necessarily mean a protruding end portion, and may be, for example, a circumferential end in a case where the self-heating layer is a circular self-heating layer.

A moisture adsorption performance of the adsorption layer 3 can be assumed by a humidity difference between an upstream hygrometer 10 and a downstream hygrometer 11 which are installed. In other words, in a case where the above-mentioned humidity difference becomes small to a certain extent, a moisture adsorption performance of the adsorption layer 3 can be determined to have deteriorated.

As described above, in the self-heating sheet-like material for moisture absorption and desorption, the moisture absorption and desorption body, and the moisture absorption and desorption device using the same of the present invention, the self-heating layer and the adsorption layer are connected in a state in which heat conduction is enabled, and thus a rate of adsorbed moisture release is extremely rapid; and the self-heating layer functions as an aggregate, and thus workability is excellent even in a case in which processing into a honeycomb structure, a corrugated structure, and the like has been performed.

Furthermore, in a case where, regarding a relationship between compressive stress and distortion, a self-heating layer includes a first region exhibiting plastic deformation, and a second region exhibiting elastic deformation which appears in a region where a compressive stress is greater than that of the first region, it is possible to further improve workability of a honeycomb structure, corrugated structure, and the like. Therefore, it is possible to provide a self-heating sheet-like material for moisture absorption and desorption, which is also excellent in form stability after processing, a moisture absorption and desorption body, and a moisture absorption and desorption device using the same.

Figure 7:
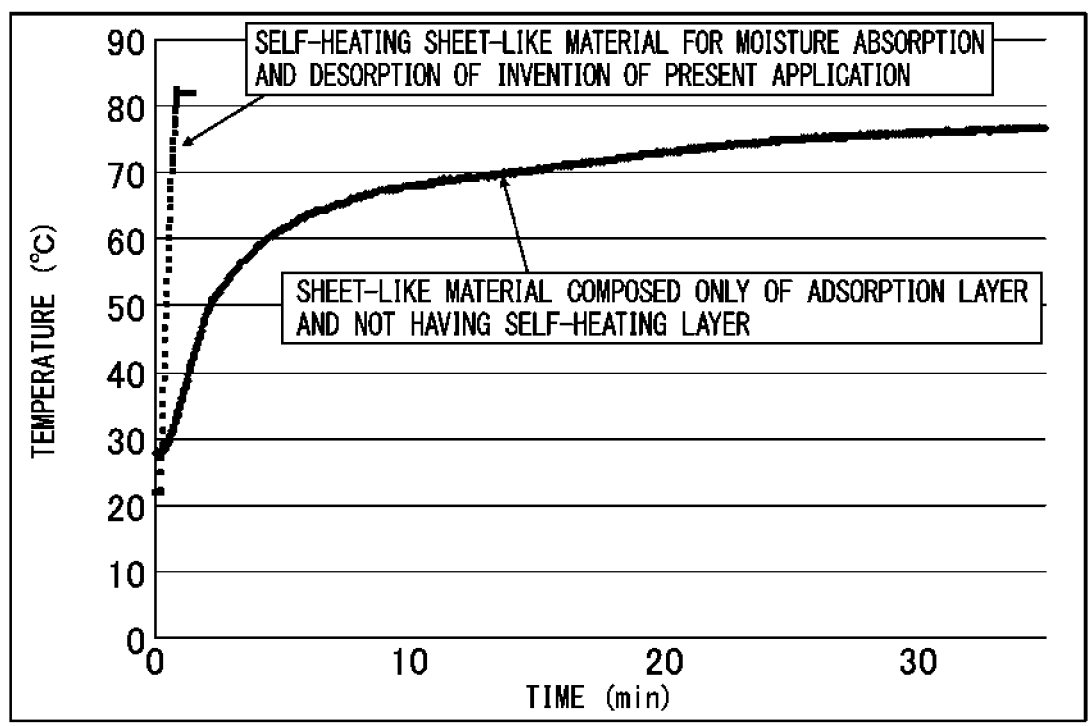
FIG. 7 is a graph showing a rate of temperature rise of an adsorption layer.

FIG. 7 is a graph showing a relationship between a heating time and a temperature rise between the self-heating sheet-like material for moisture absorption and desorption of the present invention, and a sheet-like material composed only of an adsorption layer and not having a self-heating layer.

The self-heating sheet-like material for moisture absorption and desorption of the present invention has an aspect in which a self-heating layer having a thickness of 500 μm and a basis weight of 100 g/m$^2$, which is made of a stainless steel fiber sintered body having a fiber diameter of 8 μm and a fiber length of 3 mm, is bonded to an adsorption layer which is a product of paper-making, in which an aluminum silicate complex composed of a low crystalline-layered clay mineral and an amorphous aluminum silicate is supported on pulp fibers (an addition amount of the aluminum silicate complex being 90 wt % with respect 100% of the entire adsorption layer, and a basis weight being 250 g/m$^2$) via an adhesion layer which is a sheet obtained by paper-making and is made of polyethylene terephthalate having a core-sheath structure.

In the sheet-like material composed only of the adsorption layer, an adsorption layer that is the same as the above-mentioned adsorption layer which is a product of paper-making, in which an aluminum silicate complex composed of a low crystalline-layered clay mineral and an amorphous aluminum silicate is supported on pulp fibers, is used.

A test method by which a relationship between a heating time and a temperature rise was checked is as follows.

<Self-Heating Sheet-Like Material for Moisture Absorption and Desorption of the Present Invention>

Terminals of a DC power supply were connected to both ends of a self-heating layer, and the self-heating layer was energized (with no air flow or hot air) under conditions where the center of the self-heating layer became 80° C. A temperature rise value of an adsorption layer was measured for each elapsed time by a K thermocouple attached to the adsorption layer.

<Sheet-Like Material Composed Only of Adsorption Layer and not Having Self-Heating Layer>

A temperature rise value of the adsorption layer when hot air at 80° C. was able to pass through the adsorption layer was measured for each elapsed time by a K thermocouple attached to the adsorption layer.

As can be seen from the graph showing a temperature rise of the adsorption layer in FIG. 7, in the self-heating sheet-like material for moisture absorption and desorption of the present invention in which the self-heating layer and the adsorption layer are connected in a state in which heat conduction is enabled, a temperature rise of the adsorption layer is extremely fast, as compared with an aspect in which hot air is able to pass through a sheet-like material composed only of the adsorption layer. A hygroscopic agent constituting the adsorption layer desorbs adsorbed moisture once reaching a predetermined temperature, and therefore a rapid temperature rise of the adsorption layer can be said to indicate that a rate of moisture release is extremely rapid.

REFERENCE SIGNS LIST

1 Self-heating layer
2 Adhesion layer
3 Adsorption layer
4 Moisture absorption and desorption body
5 Core
6 Liner
7 Electrode
8 Power supply
9 Controller
10 Upstream hygrometer
11 Downstream hygrometer
A First region exhibiting plastic deformation
B Second region exhibiting elastic deformation
B1 Elastic deformation region anterior to inflection portion a
B2 Elastic deformation region posterior to inflection portion a
a Inflection portion

The invention claimed is:

1. A self-heating sheet-like material for moisture absorption and desorption, comprising at least:
a self-heating layer and an adsorption layer in a laminate thereof,
wherein the self-heating layer and the adsorption layer are connected in a state in which heat conduction is enabled,
wherein, regarding a relationship between compressive stress and distortion, the self-heating layer includes
a first region exhibiting plastic deformation, and
a second region exhibiting elastic deformation which appears in a region where a compressive stress is greater than that of the first region.

2. The self-heating sheet-like material for moisture absorption and desorption according to claim 1, wherein the self-heating layer and the adsorption layer are laminated with an adhesion layer therebetween.

3. The self-heating sheet-like material for moisture absorption and desorption according to claim 1, wherein the self-heating layer includes an electrode at a free end thereof.

4. The self-heating sheet-like material for moisture absorption and desorption according to claim 1, wherein the self-heating layer is made of a metallic fiber sintered body.

5. The self-heating sheet-like material for moisture absorption and desorption according to claim 4, wherein fibers constituting the metallic fiber sintered body include at least stainless steel fibers.

6. The self-heating sheet-like material for moisture absorption and desorption according to claim 2, wherein the adhesion layer includes at least synthetic fibers.

7. The self-heating sheet-like material for moisture absorption and desorption according to claim 1, wherein the adsorption layer includes organic fibers, and at least one or more hygroscopic agents selected from organic hygroscopic agents and inorganic hygroscopic agents.

8. A moisture absorption and desorption body comprising the self-heating sheet-like material for moisture absorption and desorption according to claim 1.

9. A moisture absorption and desorption device, comprising:
an electrical circuit for supplying current to the electrode; and
the self-heating sheet-like material for moisture absorption and desorption or the moisture absorption and desorption body according to claim 3.

* * * * *